United States Patent
Chahwan et al.

(10) Patent No.: US 8,767,332 B1
(45) Date of Patent: Jul. 1, 2014

(54) DISK DRIVE PREDICTING OFF-TRACK ERROR DUE TO DISTURBANCES OCCURRING OVER DIFFERENT FREQUENCY RANGES

(71) Applicant: Western Digital Technologies, Inc., Irvine, CA (US)

(72) Inventors: Alain Chahwan, Irvine, CA (US); Jianguo Zhou, Foothill Ranch, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/856,410

(22) Filed: Apr. 3, 2013

(51) Int. Cl.
G11B 19/04 (2006.01)
G11B 5/596 (2006.01)

(52) U.S. Cl.
USPC .................. 360/60; 360/77.08; 360/77.02

(58) Field of Classification Search
None
See application file for complete search history.

(56) References Cited

U.S. PATENT DOCUMENTS

| | | | |
|---|---|---|---|
| 6,031,317 A | 2/2000 | Chen | |
| 6,115,200 A | 9/2000 | Allen et al. | |
| 6,496,315 B1 | 12/2002 | Ueda et al. | |
| 6,629,462 B2 | 10/2003 | Otsuchi et al. | |
| 6,714,371 B1 | 3/2004 | Codilian | |
| 6,882,489 B1 | 4/2005 | Brunnett et al. | |
| 6,909,574 B2 | 6/2005 | Aikawa et al. | |
| 6,958,882 B2 | 10/2005 | Kisaka | |
| 6,967,804 B1 | 11/2005 | Codilian | |
| 7,002,766 B2 | 2/2006 | Kisaka et al. | |
| 7,068,451 B1 | 6/2006 | Wang et al. | |
| 7,142,385 B2 | 11/2006 | Shimotono et al. | |
| 7,154,690 B1 | 12/2006 | Brunnett et al. | |
| 7,253,982 B1 | 8/2007 | Brunnett et al. | |
| 7,349,174 B2 | 3/2008 | Bi et al. | |
| 7,471,483 B1 | 12/2008 | Ferris et al. | |
| 7,506,223 B2 | 3/2009 | Lee | |
| 7,558,016 B1 | 7/2009 | Le et al. | |
| 7,826,163 B2 | 11/2010 | Harmer et al. | |
| 7,852,588 B1 | 12/2010 | Ferris et al. | |
| 7,903,364 B2 | 3/2011 | Jeong | |
| 8,179,626 B1 * | 5/2012 | Ryan et al. | 360/31 |
| 8,315,006 B1 | 11/2012 | Chahwan et al. | |
| 2004/0246617 A1 | 12/2004 | Ehrlich | |
| 2007/0263326 A1 | 11/2007 | Strom et al. | |
| 2008/0225428 A1 * | 9/2008 | Ishiguro | 360/75 |

* cited by examiner

*Primary Examiner* — Andrew L Sniezek

(57) ABSTRACT

A disk drive is disclosed comprising a disk, a head, and control circuitry comprising a servo control system operable to actuate the head over the disk. A vibration signal VS(k) is measured representing a disturbance in the servo control system. A first future value of the vibration signal VS(k) is predicted based on:

$$VS1(k+1) = \alpha_1[VS(k) - VS(k-1)] + VS(k)$$

where $\alpha_1$ is a first scalar corresponding to a first frequency range. A second future value of the vibration signal VS(k) is predicted based on:

$$VS2(k+1) = \alpha_2[VS(k) - VS(k-1)] + VS(k)$$

where $\alpha_2$ is a second scalar corresponding to a second frequency range different from the first frequency range.

20 Claims, 7 Drawing Sheets

DISK DRIVE PREDICTING OFF-TRACK ERROR DUE TO DISTURBANCES OCCURRING OVER DIFFERENT FREQUENCY RANGES

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6, further comprises groups of servo bursts 14 (A, B, C, D in the example shown), which are recorded with precise intervals and offsets relative to the servo track centerlines. The servo bursts 14 provide fine head position information used for centerline tracking while accessing a data track during write/read operations.

It is desirable to detect off-track errors due, for example, to rotational and/or linear physical shocks to the disk drive, as well as a thermal popping disturbance typically caused by mechanically mated parts that have different coefficients of thermal expansion. When an off-track error is detected, the disk drive may take appropriate action, such as aborting a write operation to avoid corrupting the data recorded in the adjacent tracks.

DETAILED DESCRIPTION

Figure 2A:
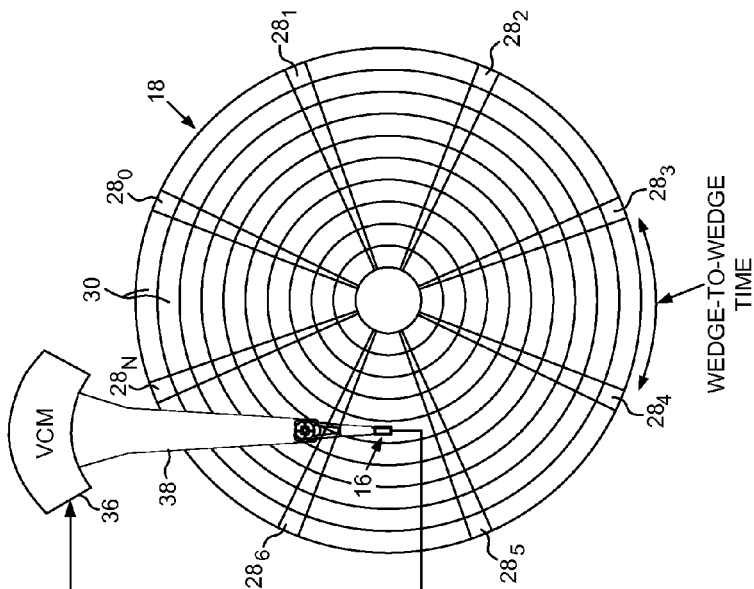
FIG. 2A shows a disk drive according to an embodiment comprising a head actuated over a disk.

FIG. 2A shows a disk drive according to an embodiment comprising a disk 16, a head 18, and control circuitry 20 comprising a servo control system operable to actuate the head 18 over the disk 16. The control circuitry 20 is operable to execute the flow diagram of FIG. 2B wherein a vibration signal VS(k) is measured representing a disturbance in the servo control system (block 22). A first future value of the vibration signal VS(k) is predicted (block 24) based on:

$$VS1(k+1)=\alpha_1[VS(k)-VS(k-1)]+VS(k)$$

where $\alpha_1$ is a first scalar corresponding to a first frequency range. A second future value of the vibration signal VS(k) is predicted (block 26) based on:

$$VS2(k+1)=\alpha_2[VS(k)-VS(k-1)]+VS(k)$$

where $\alpha_2$ is a second scalar corresponding to a second frequency range different from the first frequency range.

Figure 1:
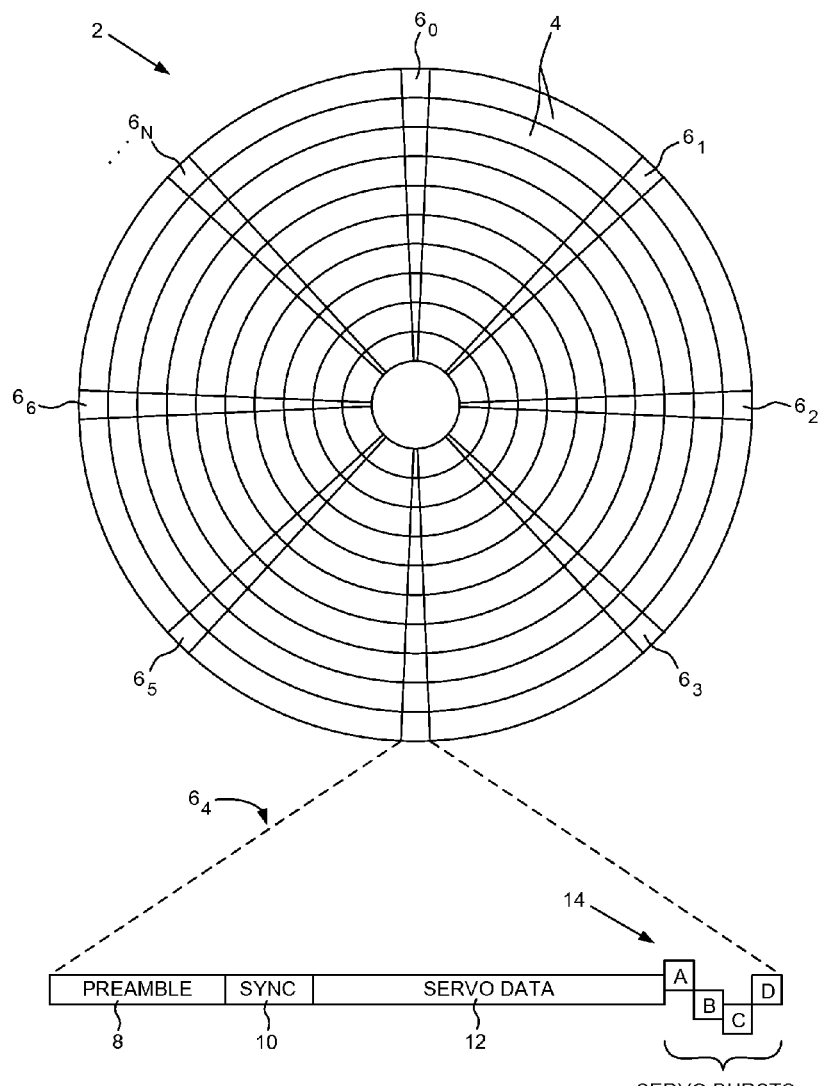
FIG. 1 shows a prior art disk format comprising a plurality of servo tracks defined by embedded servo sectors.

In the embodiment of FIG. 2A, the disk 16 comprises embedded servo sectors $28_0$-$28_N$ that define a plurality of servo tracks 30, wherein data tracks are defined relative to the servo tracks 30 at the same or different radial density. The control circuitry 20 processes a read signal 32 emanating from the head 18 to demodulate the servo sectors $28_0$-$28_N$ and generate a position error signal (PES) representing an error between the actual position of the head and a target position relative to a target track. The servo control system within the control circuitry 20 filters the PES using a suitable compensation filter to generate a control signal 34 applied to a voice coil motor (VCM) 36 which rotates an actuator arm 38 about a pivot in order to actuate the head 18 radially over the disk 16 in a direction that reduces the PES. The servo sectors $28_0$-$28_N$ may comprise any suitable position information, such as a track address for coarse positioning and servo bursts for fine positioning. The servo bursts may comprise any suitable pattern, such as the amplitude-based servo pattern shown in FIG. 1, or a suitable phase-based servo pattern.

In one embodiment, the vibration signal VS(k) may be used to abort a write operation to prevent corrupting the data of adjacent tracks due to an off-track write, as well as perform a retry operation to ensure the integrity of the current write operation. In one embodiment, future values of the vibration signal VS(k) are predicted so as to predict an off-track condition before it occurs, thereby better protecting the data in adjacent data tracks. The reliability of the predicted values may vary based on a frequency of a disturbance affecting the disk drive. For example, a linear physical shock may manifest in the vibration signal VS(k) across a first frequency range, whereas a thermal popping may manifest across a second frequency range higher than the first frequency range. In one embodiment, different scalars are used to generate the prediction values across the different frequency ranges. An example of this embodiment is shown in FIG. 2C wherein a first scalar $\alpha_1$ of less than a half is used to generate the future values of the vibration signal VS(k) corresponding to a first frequency range, and a second scalar $\alpha_2$ of greater than a half is used to generate the future values of the vibration signal VS(k) corresponding to a second, higher frequency range.

That is, when generating the future values of the vibration signal corresponding to a higher frequency range (e.g., to detect thermal popping), the scalar used to generate the future values is increased in order to increase the sensitivity of the future values.

In one embodiment, a write operation may be aborted if a future value of the vibration signal VS(k) exceeds a threshold. In the example embodiment of FIGS. 2B and 2C, the future values corresponding to different frequency ranges are generated by using different values for the scalar α. The resulting future values may then be compared to corresponding thresholds. For example, the first future values VS1(k+1) generated at block 24 may be compared to a first threshold, and the second future values VS2(k+1) generated at block 26 may be compared to a second threshold different than the first threshold. For example, in one embodiment the second threshold may be higher than the first threshold to compensate for the increased sensitivity due to the higher scalar $\alpha_2$.

In one embodiment, the scalars and/or the thresholds may be calibrated and/or adapted toward values that maximize the accuracy of the predictions. For example, in one embodiment a write operation may be aborted when a future value exceeds its corresponding threshold. After aborting the write operation, the actual value of the vibration signal VS(k) may still be measured and used to generate an error between the actual and predicted value. Alternatively, the actual value may be compared to a threshold to determine whether the write operation would have been aborted. In either embodiment, the scalars and/or thresholds may be adjusted so as to generate a more accurate prediction of future values going forward. Similarly, if a future value does not exceed its corresponding threshold but the actual value exceeds a threshold that triggers a write abort, the scalars and/or thresholds may be adjusted so as to generate a more accurate prediction of future values going forward.

Figure 2B:
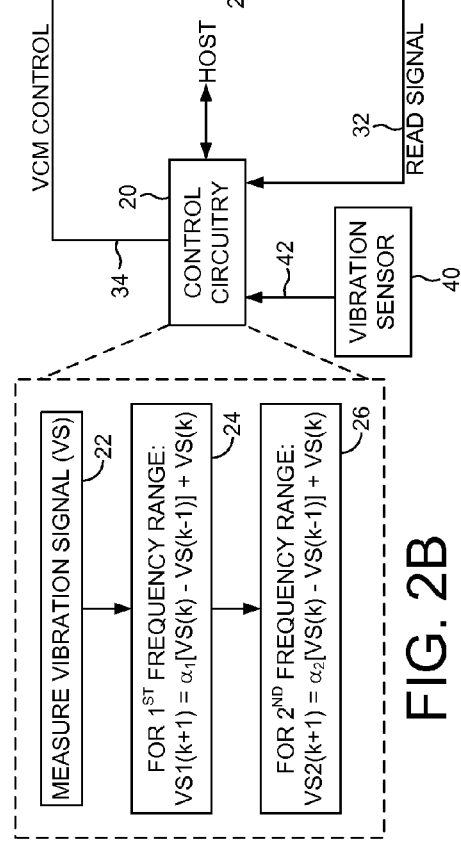
FIG. 2B is a flow diagram according to an embodiment wherein future values of a vibration signal are predicted using a first scalar for a first frequency range and using a second scalar for a second frequency range.
Figure 2C:
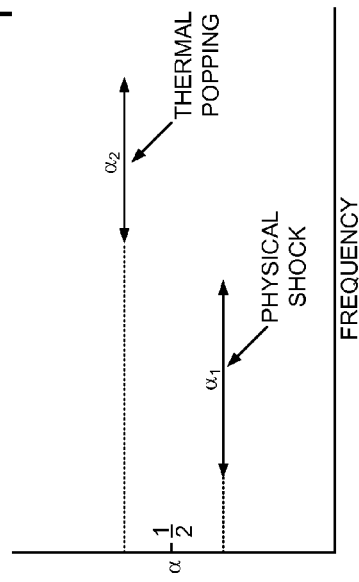
FIG. 2C shows a first scalar used over a first frequency range to predict future values of a vibration signal, and a second scalar used over a second frequency range to predict future values of the vibration signal.

The vibration signal VS(k) measured at block 22 of FIG. 2B may be generated in any suitable manner. In the embodiment of FIG. 2A, the disk drive may comprise a suitable vibration sensor 40, such as an accelerometer comprising one or more piezoelectric sensors, which may generate the vibration signal VS(k) 42 in response to a linear physical shock, thermal popping, or other disturbance. In another embodiment, the vibration signal VS(k) may be generated based on the position error signal (PES) of the servo control system.

Figure 3:
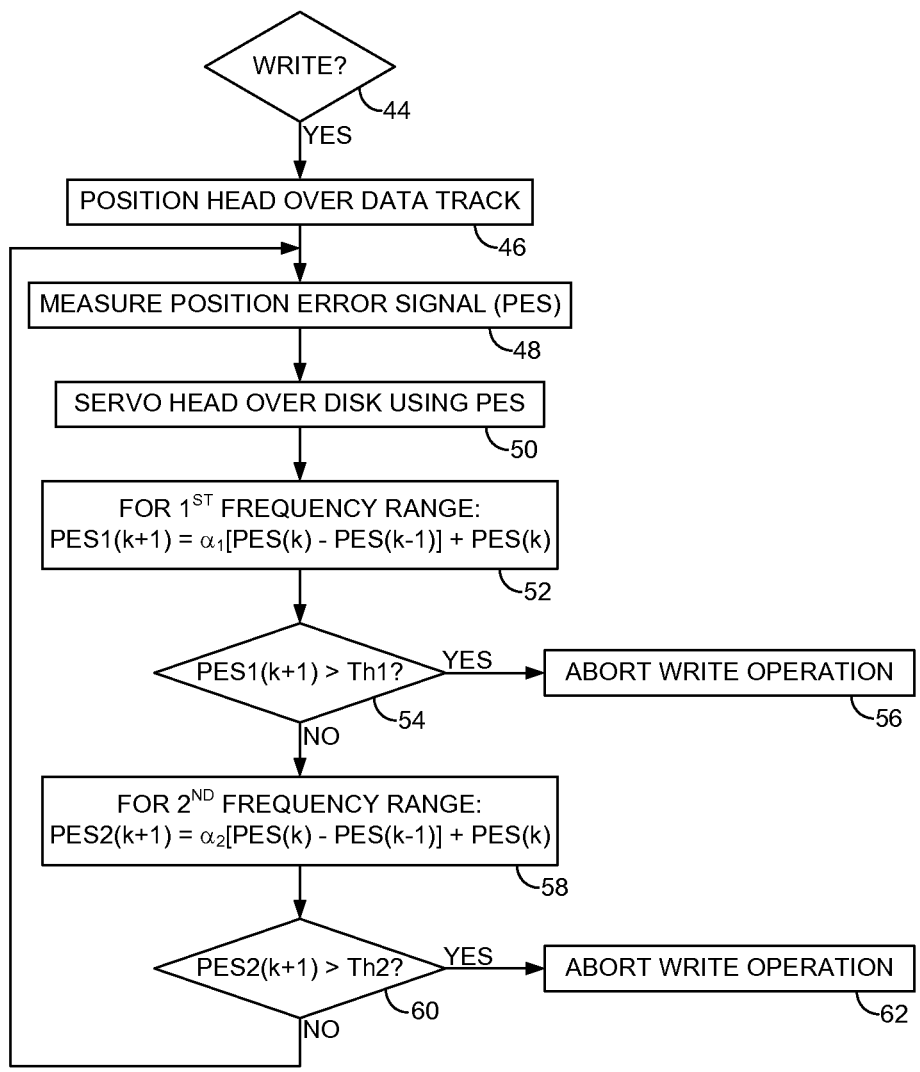
FIG. 3 is a flow diagram according to an embodiment wherein the vibration signal is generated based on a position error signal of a servo control system used to actuate the head over the disk.

An example of this embodiment is shown in the flow diagram of FIG. 3 wherein during a write operation (block 44) the head is positioned over a target data track (block 46). The servo sectors $28_0$-$28_N$ are read to generate the PES (block 48) which is used by the servo control system to servo the head over the disk (block 50). At each servo sector, a current PES(k) is generated. For the first frequency range, a first future value of the PES is predicted (block 52) using the first scalar $\alpha_1$, and the first future value is compared to a first threshold (block 54). If the first future value exceeds the first threshold, then the write operation is aborted (block 56). Otherwise for the second frequency range, a second future value of the PES is predicted (block 58) using the second scalar $\alpha_2$, and the second future value is compared to a second threshold (block 60). If the second future value exceeds the second threshold, then the write operation is aborted (block 62).

Figure 4:
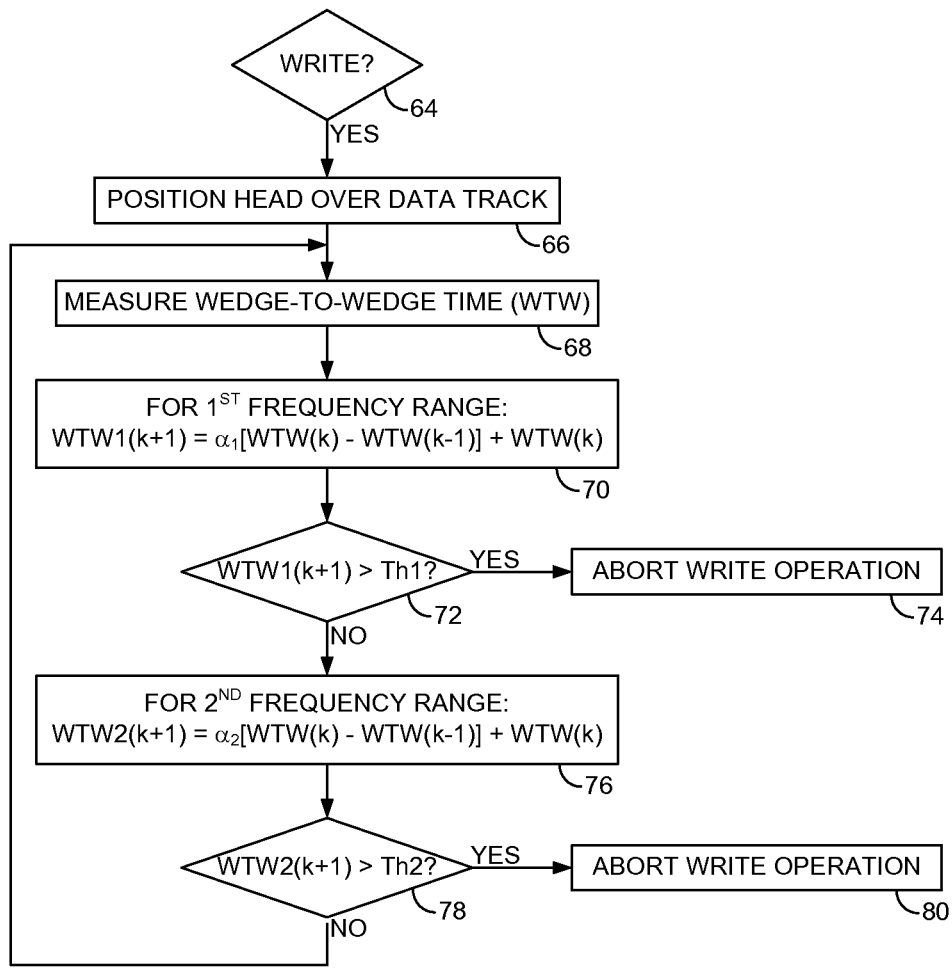
FIG. 4 is a flow diagram according to an embodiment wherein the vibration signal is generated based on a wedge-to-wedge time representing an interval between the head passing over consecutive servo sectors.

FIG. 4 is a flow diagram according to an embodiment wherein during a write operation (block 64) the head is positioned over a target data track (block 66) and the servo sectors $28_0$-$28_N$ are read to measure a wedge-to-wedge (WTW) time representing an interval between the head passing over consecutive servo sectors (block 68). For the first frequency range, a first future value of the WTW time is predicted (block 70) using the first scalar $\alpha_1$, and the first future value is compared to a first threshold (block 72). If the first future value exceeds the first threshold, then the write operation is aborted (block 74). Otherwise for the second frequency range, a second future value of the WTW time is predicted (block 76) using the second scalar $\alpha_2$, and the second future value is compared to a second threshold (block 78). If the second future value exceeds the second threshold, then the write operation is aborted (block 80).

Figure 5A:
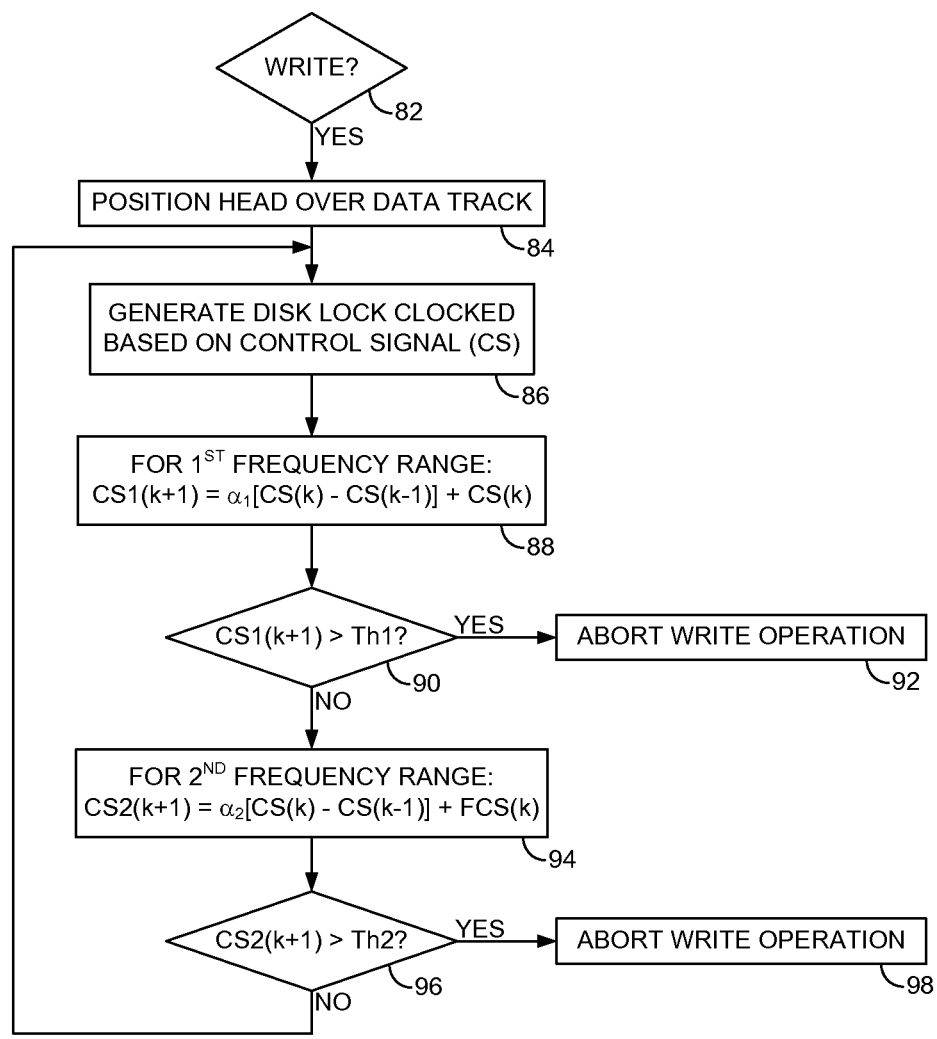
FIG. 5A is a flow diagram according to an embodiment wherein the vibration signal is generated based on a control signal used to generate a disk-locked clock synchronized to a rotation of the disk.

FIG. 5A is a flow diagram according to an embodiment wherein during a write operation (block 82) the head is positioned over a target data track (block 84) and a control signal (CS) is used to generate a disk locked clock synchronized to the rotation of the disk (block 86). For the first frequency range, a first future value of the CS is predicted (block 88) using the first scalar $\alpha_1$, and the first future value is compared to a first threshold (block 90). If the first future value exceeds the first threshold, then the write operation is aborted (block 92). Otherwise for the second frequency range, a second future value of the CS is predicted (block 94) using the second scalar $\alpha_2$, and the second future value is compared to a second threshold (block 96). If the second future value exceeds the second threshold, then the write operation is aborted (block 98).

Figure 5B:
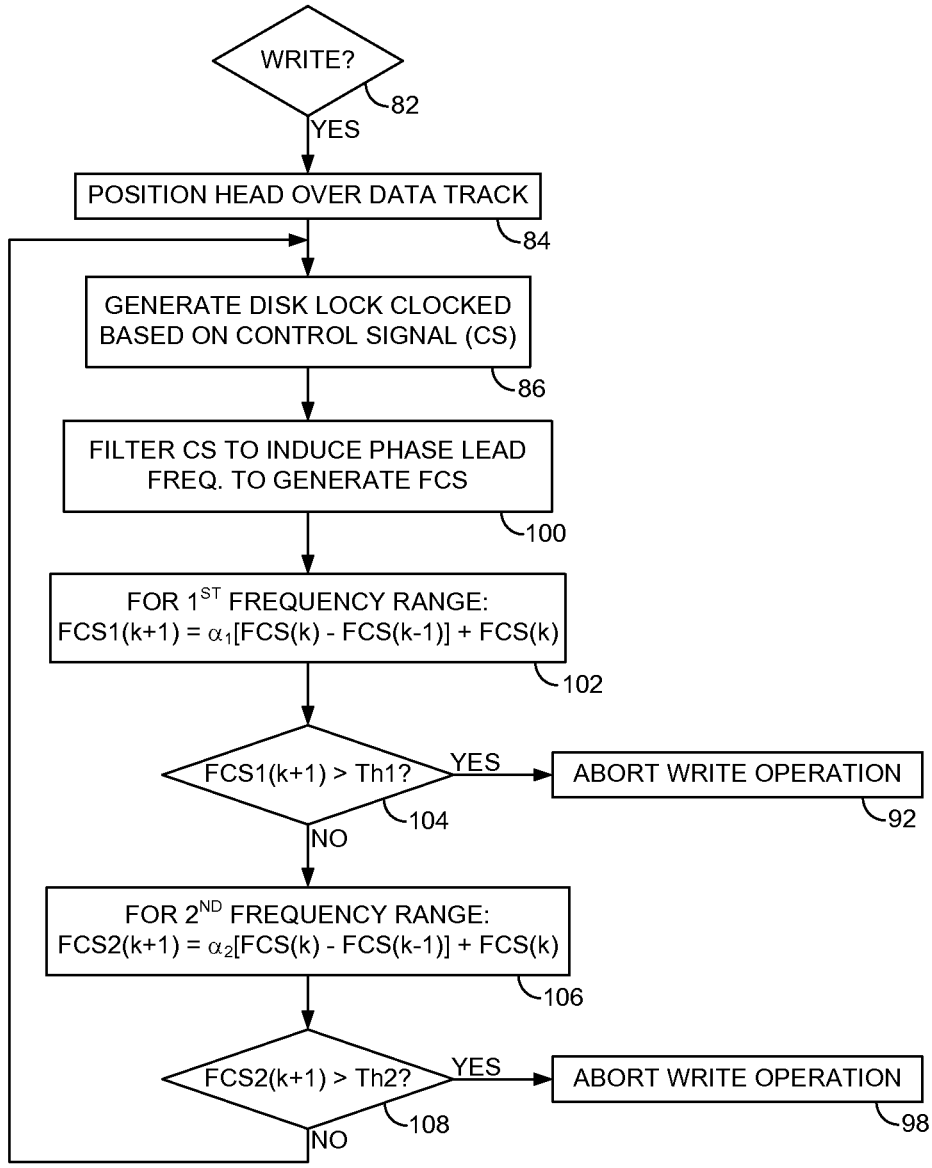
FIG. 5B is a flow diagram according to an embodiment wherein the control signal used to generate the disk-locked clock is filtered to induce a phase lead into the control signal.

FIG. 5B is a flow diagram which extends on the flow diagram of FIG. 5A, wherein the CS is filtered to induce a phase lead into the CS in order to improve the accuracy of the prediction. For the first frequency range, a first future value of the filtered CS is predicted (block 102) using the first scalar $\alpha_1$, and the first future value is compared to a first threshold (block 104). If the first future value exceeds the first threshold, then the write operation is aborted (block 92). Otherwise for the second frequency range, a second future value of the filtered CS is predicted (block 106) using the second scalar $\alpha_2$, and the second future value is compared to a second threshold (block 108). If the second future value exceeds the second threshold, then the write operation is aborted (block 98).

Figure 5C:
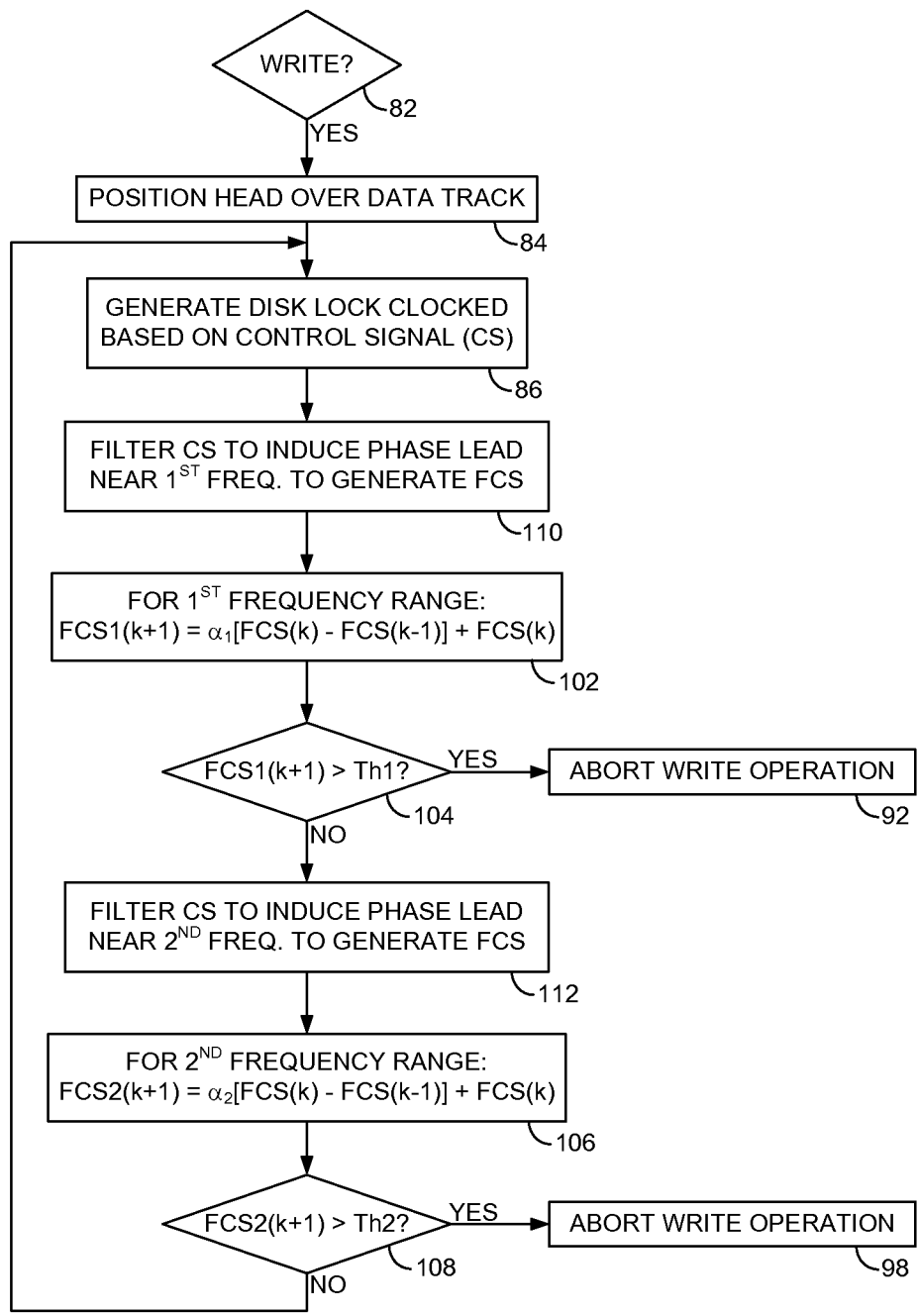
FIG. 5C is a flow diagram according to an embodiment wherein the control signal used to generate the disk-locked clock is filtered to induce a phase lead into the control signal proximate the first and second frequency ranges.

FIG. 5C is a flow diagram which extends on the flow diagram of FIG. 5B, wherein the CS is filtered to induce a phase lead into the CS proximate the first frequency range (block 110). For the first frequency range, a first future value of the filtered CS is predicted (block 102) using the first scalar $\alpha_1$, and the first future value is compared to a first threshold (block 104). If the first future value exceeds the first threshold, then the write operation is aborted (block 92). Otherwise the CS is filtered to induce a phase lead into the control signal proximate the second frequency range (block 112). For the second frequency range, a second future value of the filtered CS is predicted (block 106) using the second scalar $\alpha_2$, and the second future value is compared to a second threshold (block 108). If the second future value exceeds the second threshold, then the write operation is aborted (block 98).

In the embodiment of FIG. 2C, the first future values of the vibration signal are generated using a first scalar corresponding to a linear physical shock that typically manifests over a first frequency range, and the second future values of the vibration signal are generated using a second scalar corresponding to a thermal popping that typically manifests over a second, non-overlapping frequency range. In an alternative embodiment, the first and second frequency ranges may overlap, and in other embodiments, more than two scalars may be employed covering more than two frequency ranges (e.g., to compensate for more than two types of disturbances).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
   a disk;
   a head; and
   control circuitry comprising a servo control system operable to actuate the head over the disk, the control circuitry operable to:
      measure a vibration signal VS(k) representing a disturbance in the servo control system;
      predict a first future value of the vibration signal VS(k) based on:

$$VS1(k+1)=\alpha_1[VS(k)-VS(k-1)]+VS(k)$$

where $\alpha_1$ is a first scalar corresponding to a first frequency range; and
predict a second future value of the vibration signal VS(k) based on:

$$VS2(k+1)=\alpha_2[VS(k)-VS(k-1)]+VS(k)$$

where $\alpha_2$ is a second scalar corresponding to a second frequency range different from the first frequency range.

2. The disk drive as recited in claim 1, wherein:
the first frequency range corresponds to a physical vibration; and
the second frequency range corresponds to a thermal popping.

3. The disk drive as recited in claim 1, wherein the second frequency range is higher than the first frequency range.

4. The disk drive as recited in claim 3, wherein:
$\alpha_1$ is less than a half; and
$\alpha_2$ is greater than a half.

5. The disk drive as recited in claim 1, wherein the control circuitry is further operable to:
   abort a write operation when the first future value exceeds a first threshold; and
   abort the write operation when the second future value exceeds a second threshold different than the first threshold.

6. The disk drive as recited in claim 1, wherein the disk comprises a plurality of servo tracks, each servo track comprises a plurality of servo sectors, and the control circuitry is further operable to:
   generate a position error signal by reading the servo sectors; and
   generate the vibration signal based on the position error signal.

7. The disk drive as recited in claim 1, wherein the disk comprises a plurality of servo tracks, each servo track comprises a plurality of servo sectors, and the control circuitry is further operable to:
   measure a wedge-to-wedge time representing an interval between the head passing over consecutive servo sectors; and
   generate the vibration signal based on the wedge-to-wedge time.

8. The disk drive as recited in claim 1, wherein the control circuitry is further operable to:
   generate a disk-locked clock synchronized to a rotation of the disk; and
   generate the vibration signal based on a control signal used to generate the disk locked clock.

9. The disk drive as recited in claim 8, wherein the control circuitry is further operable to generate the vibrating signal by filtering the control signal to induce a phase lead into the control signal.

10. The disk drive as recited in claim 9, wherein the control circuitry is further operable to:
    prior to predicting the first future value of the vibration signal, first filter the control signal to induce a first phase lead into the control signal proximate the first frequency range; and
    prior to predicting the second future value of the vibration signal, second filter the control signal to induce a second phase lead into the control signal proximate the second frequency range.

11. A method of operating a disk drive comprising a head, a disk, and a servo control system operable to actuate the head over the disk, the method comprising:

measuring a vibration signal VS(k) representing a disturbance in the servo control system;

predicting a first future value of the vibration signal VS(k) based on:

$$VS1(k+1)=\alpha_1[VS(k)-VS(k-1)]+VS(k)$$

where $\alpha_1$ is a first scalar corresponding to a first frequency range; and predicting a second future value of the vibration signal VS(k) based on:

$$VS2(k+1)=\alpha_2[VS(k)-VS(k-1)]+VS(k)$$

where $\alpha_2$ is a second scalar corresponding to a second frequency range different from the first frequency range.

12. The method as recited in claim 11, wherein:
the first frequency range corresponds to a physical vibration; and
the second frequency range corresponds to a thermal popping.

13. The method as recited in claim 11, wherein the second frequency range is higher than the first frequency range.

14. The method as recited in claim 13, wherein:
$\alpha_1$ is less than a half; and
$\alpha_2$ is greater than a half.

15. The method as recited in claim 11, further comprising:
aborting a write operation when the first future value exceeds a first threshold; and
aborting the write operation when the second future value exceeds a second threshold different than the first threshold.

16. The method as recited in claim 11, wherein the disk comprises a plurality of servo tracks, each servo track comprises a plurality of servo sectors, and the method further comprises:

generating a position error signal by reading the servo sectors; and
generating the vibration signal based on the position error signal.

17. The method as recited in claim 11, wherein the disk comprises a plurality of servo tracks, each servo track comprises a plurality of servo sectors, and the method further comprises:
measuring a wedge-to-wedge time representing an interval between the head passing over consecutive servo sectors; and
generating the vibration signal based on the wedge-to-wedge time.

18. The method as recited in claim 11, further comprising:
generating a disk-locked clock synchronized to a rotation of the disk; and
generating the vibration signal based on a control signal used to generate the disk locked clock.

19. The method as recited in claim 18, further comprising generating the vibrating signal by filtering the control signal to induce a phase lead into the control signal.

20. The method as recited in claim 19, further comprising:
prior to predicting the first future value of the vibration signal, first filtering the control signal to induce a first phase lead into the control signal proximate the first frequency range; and
prior to predicting the second future value of the vibration signal, second filtering the control signal to induce a second phase lead into the control signal proximate the second frequency range.

\* \* \* \* \*